United States Patent [19]
Ballard et al.

[11] Patent Number: 4,515,478
[45] Date of Patent: May 7, 1985

[54] COHERENT LIGHT DETECTING SYSTEM INCLUDING PASSIVE AVERAGING NETWORK

[75] Inventors: Paul T. Ballard; Gordon R. Little, both of Kettering, Ohio

[73] Assignee: Systems Research Laboratories, Inc., Dayton, Ohio

[21] Appl. No.: 439,475

[22] Filed: Nov. 5, 1982

[51] Int. Cl.³ .............................................. G01B 9/02
[52] U.S. Cl. .................................. 356/345; 250/550; 356/346; 356/352
[58] Field of Search ............... 356/345, 346, 352, 353; 250/550, 214 B, 209

[56] References Cited

U.S. PATENT DOCUMENTS

| | | |
|---|---|---|
| 3,475,613 | 10/1969 | Meyers . |
| 3,624,538 | 11/1971 | Gere et al. . |
| 3,718,821 | 2/1973 | Vischulis . |
| 3,881,568 | 5/1975 | Ando et al. . |
| 3,977,792 | 8/1976 | Jumonji et al. . |
| 4,219,276 | 8/1980 | Dorsman . |

OTHER PUBLICATIONS

Chang et al., "Diameter Measurements of Fabry-Perot Interference Rings Using CCD Linear Sensors", *Optics Communications*, vol. 30, No. 2, pp. 239–244, 8/79.

*Primary Examiner*—Davis L. Willis
*Assistant Examiner*—Matthew W. Koren
*Attorney, Agent, or Firm*—Biebel, French & Nauman

[57] ABSTRACT

Interference patterns are generated in response to temporally coherent light incident upon an interferometer which directs the interference patterns upon an array of photosensitive elements. The photosensitive elements are connected to generate signals representative of the optical energy respectively incident on the elements. The output signals of the photosensitive elements are averaged by a passive resistor network coupled to the photosensitive elements and the signals generated by the individual elements are compared to the average signal by individual comparator circuits to detect the presence and position of an interference pattern directed upon the array.

11 Claims, 2 Drawing Figures

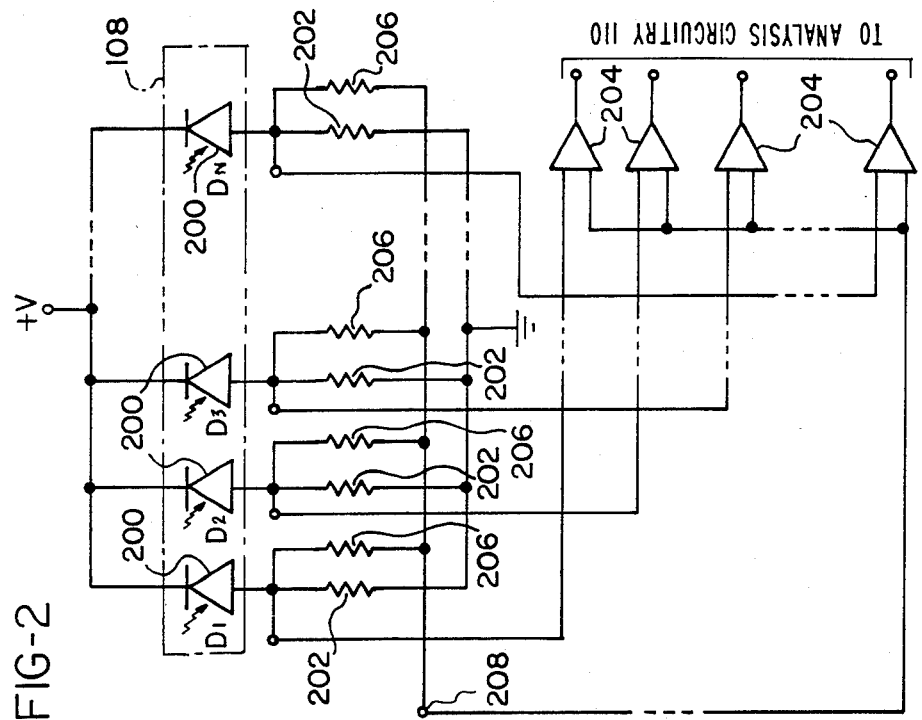
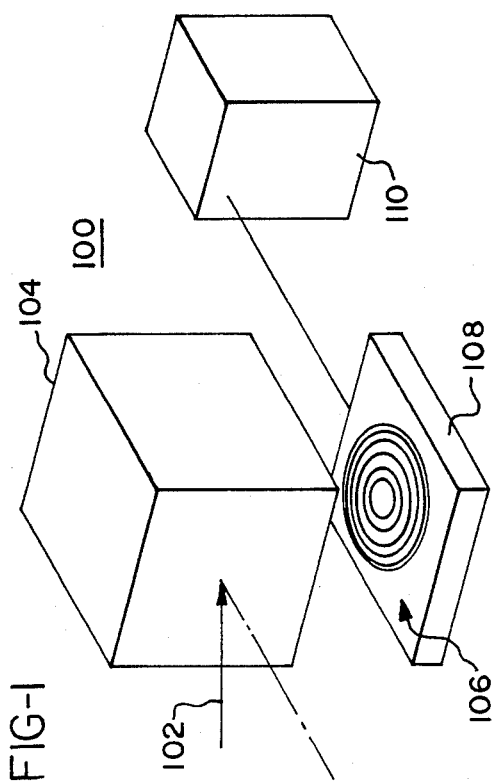
FIG-2
FIG-1

COHERENT LIGHT DETECTING SYSTEM INCLUDING PASSIVE AVERAGING NETWORK

BACKGROUND OF THE INVENTION

The present invention relates generally to optical detection systems and, more particularly, to an optical detection system for monitoring interference patterns generated in response to temporally coherent light sources of widely varying intensities in the presence of widely varying background light levels.

Temporally coherent light, such as from a laser, is utilized to determine the range to a target or to guide a weapon to that target. Hence, in order to counter such ranging and weapons deliver systems, it is first necessary to determine whether laser light is incident upon a potential target and, if present, the location of the source of the laser light. For detection, incident light is directed to an interferometer which generates an interference pattern upon illumination by temporally coherent light. The interference pattern is monitored by an array of light detecting elements which generate voltage or current signals representative of the light incident upon the respective elements.

Background signals due to dark current integration in the array of light detecting elements or ambient incoherent illumination, such as sunlight, can be a problem. In the optical detecting system of the present invention, background signals occur with wide variations in intensity. Such wide variations are encountered since a system for detecting laser light used for ranging or weapon guidance must scan the sky whether installed on ground-based equipment or on aircraft. Under such circumstances, the light receiver for the system may look nearly directly into the sun. The intensity of the coherent light is similarly widely varying since it may be directly incident upon the light receiver of the detecting system or may be received indirectly by atmospheric scattering.

One solution to excessive background signals is to have processing circuitry subtract an average of the output signals of all the detector elements of an array from the signal of each detector element prior to further processing. For example, in the prior art, all of the voltage signals from a plurality of individual detector elements are summed by an operational amplifier and the sum is divided by the number of elements to generate the average voltage level of the voltage signals. The average voltage level is then subtracted from each of the signals from the detector elements to determine which of the detectors are sensing light fringes (element voltage signal exceeds the average voltage level) and which of the elements are sensing dark fringes (average voltage level exceeds the element voltage signal) of the interference pattern.

In the worst case, coherent and/or incoherent light signals can become so large that they drive the averaging amplifier associated with the detector array into saturation in spite of such measures. If this occurs, then all information is lost and the detecting system is effectively disabled. The problem of excessive background signals can be recognized to be in the circuitry which processes the light detector output signals since the light detectors themselves, particularly semiconductor photodiodes, have an enormous dynamic range exceeding 100 dB for some devices.

The need therefore exists for an improved system which permits the detection and location of an interference pattern to be determined where the interference pattern is generated in response to temporally coherent light which has widely varying intensities and is intermixed with background light also having widely varying intensities.

SUMMARY OF THE INVENTION

In accordance with the present invention, an interferometer generates interference patterns in response to any temporally coherent light which is present in light incident upon it and directs the interference patterns upon an array of photosensitive elements. The photosensitive elements are connected to generate signals representative of the optical energy respectively incident on the individual elements. Signal averaging means comprising a passive resistor network is coupled to the photosensitive elements for deriving an average signal from the plurality of signals generated by the elements, and comparator means are provided for comparing the signals generated by the individual elements to the average signal. Accordingly, the presence and position of an interference pattern directed upon the array of photosensitive elements are determined by sensing the light level at each of the individual photosensitive elements and comparing the light levels to the average signal.

In the preferred embodiment, the signals are voltage signals and the passive resistor network comprises a plurality of resistors corresponding in number to the photosensitive elements with the resistors having one end connected to the photosensitive elements and the other end connected to a common junction to generate an average voltage signal at the common junction.

In the preferred embodiment of the present invention, the comparator means comprises a plurality of operational amplifier circuits corresponding in number to the photosensitive elements with each of the operational amplifier circuits presenting a high impedance input to the average voltage signal and being connected for differential amplification. Also, the photosensitive elements comprise photodiodes each having an anode and a cathode. The anode of each photodiode is connected to a load resistor and the series combination of the photodiode and the load resistor are connected across a source of potential. The resistors of the passive averaging network are individually connected to the anodes of the photodiodes.

It is, therefore, an object of the present invention to provide apparatus which monitors an optical interference pattern generated by an interferometer from temporally coherent light having widely varying intensities and which is intermixed with background light, for example sunlight, also having widely varying intensities.

Other objects and advantages of the invention will be apparent from the following description, the accompanying drawings and the appended claims.

BRIEF DESCRIPTION OF THE DRAWINGS

FIG. 1 is a block diagram of an interference pattern monitoring system in accordance with the present invention.

FIG. 2 is a schematic diagram showing an array of photosensitive elements, a passive averaging network and comparators which compare voltage signals from the photosensitive elements with an average voltage signal.

DETAILED DESCRIPTION OF THE INVENTION

A block diagram of an interference pattern monitoring system 100 in accordance with the present invention is shown in FIG. 1. The objective of the system is to detect incoming laser light 102 in the presence of background illumination where the intensity of both the laser light and the background illumination vary widely.

An interferometer 104 receives light to be analyzed including the laser light 102. In the case of ambient incoherent illumination, such as sunlight, no interference pattern is generated. However, for temporally coherent light, such as from a laser, the interferometer 104 splits the received laser energy into two wave fronts, delays one wave front relative to the other, and recombines the wave fronts to cause interference. The resulting interference pattern 106 is directed onto an array 108 of photosensitive elements by the interferometer 104.

Interferometry is well known and a Fabry-Perot interferometer is the most common device which can be used in accordance with the present invention. The Fabry-Perot interferometer, or etalon as it is sometimes called, consists of a plane-parallel, solid dielectric spacer with partial reflectors on the front and back surfaces. Radiation incident on the front surface is divided by the reflectors so that one portion is passed directly through the device and another portion is reflected off the back and then the front surface several times. The difference in path length between the direct and reflected energy delays the reflected beam and causes interference to occur at the array 108 of photosensitive elements. For additional background information refer to an article entitled "Improving Laser Warning" at page 90 of the April 1981, Volume 13, No. 14 of *Defense Electronics*.

The presence and location of the interference pattern 106 formed on the array 108 of photosensitive detectors is determined by monitoring the light level incident on the individual photosensitive detectors of the array. Signals representative of the individual light levels are compared to a signal representative of the average light level incident on the array so that bright and dark fringes of the interference pattern can be identified. The results of the comparison are passed to analysis circuitry 110 which can determine the frequency of the incoming laser light 102 as well as the direction of incidence based on the positioning of the interference pattern 106 on the array 108.

Referring now to FiG. 2 which is a schematic diagram of the array 108 of photosensitive elements, a passive averaging network and comparators which compare the output signals from the photosensitive elements to an average signal generated by the passive averaging network. The individual photosensitive elements 200 are positioned to receive the interference pattern 106 produced by the interferometer 104. In the preferred embodiment, the photosensitive elements 200 comprise photodiodes each having an anode and a cathode. The anode of each photodiode is connected to a load resistor 202 and the series combination of the photodiodes and load resistors are connected across a source of potential with the cathodes of the photodiodes being connected to the positive terminal +V of the source.

The connection of the photodiodes and the load resistors generates a voltage signal which is representative of the light incident upon the respective photodiode at the junction between the anode of each photodiode and its corresponding load resistor. The voltage signals are passed to respective comparator circuits 204. The comparator circuits 204 compare the voltage signals to the average of all of the voltage signals. In the preferred embodiment, the comparator circuits 204 comprise differential amplifiers so that the relative magnitudes of the input signals and, hence, the information required to detect fringes can be preserved in the event of amplifier saturation.

The average of the individual voltage signals from all of the photosensitive elements 200 is generated by a passive resistor network comprising the resistors 206. The resistors 206 each have one conductor connected to the anodes of the photodiodes and the other conductor connected to a common terminal 208 which is in turn connected to the second input of each of the comparator circuits 204. The comparator circuits 204 provide a high input impedance to the signal generated on the terminal 208. Hence, the signal generated on the terminal 208 is equal to the average of all of the voltage signals generated by the individual photosensitive elements 200 as will now be shown.

The current through the nth resistor 206 due to the potential across the resistor, i.e., the difference between $V_n$, the voltage at the anode of the corresponding photodiode, and $V_A$, the voltage at the terminal 208, is given by the equation:

$$i_n = V_n - V_A/R$$

where R is the resistance of each of the resistors 206.

By Kirchoff's law, the sum of all such currents must equal zero since charge must be conserved, accordingly:

$$0 = \sum_{n=1}^{N} i_n = \frac{\sum_{n=1}^{N} V_n - \sum_{n=1}^{N} V_A}{R}$$

The above equation can be reduced to:

$$\sum_{n=1}^{N} V_n = \sum_{n=1}^{N} V_A \text{ or } V_A = \frac{\sum_{n=1}^{N} V_n}{N}$$

Thus, the voltage $V_A$ is the average of all the $V_n$'s which is the required result. By comparing the nth detector signal with $V_A$, i.e., the average signal, it can be determined whether the corresponding photosensitive element 200 is coincident with a bright fringe or a dark fringe of the interference pattern. The information can be preserved for read out in a conventional array detector by integrating charge on a capacitor or it can be amplified and latched into storage circuits for digital read out as is well known in the art.

It is to be noted that a variety of photosensitive light detecting elements including phototransistors and other photoconductor and photovoltaic devices can be utilized in alternate embodiments of the present invention. It will also be recognized by those skilled in the art that alternate embodiments comprising complementary circuitry responsive to current signals can be utilized in the present invention.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. Apparatus for detecting temporally coherent light comprising:
   an interferometer for receiving light to be analyzed;
   an array of photosensitive elements upon which interference patterns generated by said interferometer in response to temporally coherent light incident thereon are directed, said photosensitive elements being connected to generate signals representative of optical energy respectively incident thereon;
   signal averaging means comprising a passive resistor network coupled to said elements for deriving an average signal from the signals generated by said elements; and
   comparator means for comparing each of the signals generated by said elements to said average signal.

2. The apparatus of claim 1 wherein said signals comprise voltage signals and said passive resistor network comprises a plurality of resistors corresponding in number to said photosensitive elements, each of said resistors having two terminals with one of said terminals connected to a corresponding one of said photosensitive elements and the other of said terminals connected into a common junction to generate an average voltage signal at said common junction.

3. The apparatus of claim 2 wherein said comparator means comprises a plurality of operational amplifier circuits corresponding in number to said photosensitive elements, each of said operational amplifier circuits presenting a high impedance input to said average voltage signal and to the signal from the corresponding photosensitive element and being connected for differential amplification.

4. The apparatus of claim 3 wherein each of said photosensitive elements comprises a photodiode having an anode and a cathode.

5. The apparatus of claim 4 wherein each of said photodiodes has its anode connected to a load resistor with the series combination of the photodiode and the load resistor being connected across a source of potential and said plurality of resistors being individually connected to the anodes of said photodiodes.

6. Apparatus for detecting temporally coherent light intermixed with incoherent background light, said coherent and incoherent light being of widely varying and unrelated intensities, said apparatus comprising:
   an interferometer for generating an interference pattern comprising light and dark fringes in response to temporally coherent light incident thereon;
   a plurality of semiconductor photosensitive elements upon which said interference pattern is directed, said photosensitive elements generating signals representative of light energy incident thereon;
   signal averaging means comprising a passive resistor network connected to said elements for determining an average signal; and
   comparator means for comparing each of said signals to said average signal to determine whether one of said light fringes or one of said dark fringes is incident on respective ones of said elements by determining whether the corresponding signal is greater than or less than said average signal whereby the dynamic range of said semiconductor photosensitive elements can be utilized to accommodate the widely varying intensities of said coherent and incoherent light incident on said interferometer.

7. the apparatus of claim 6 wherein said signals comprise voltage signals and said passive resistor network comprises a plurality of resistors corresponding in number to said photosensitive elements, each of said resistors having two terminals with one of said terminals connected to a corresponding one of said photosensitive elements and the other of said terminals connected into a common junction to generate an average voltage signal at said common junction.

8. The apparatus of claim 7 wherein said comparator means comprises a plurality of operational amplifier circuits corresponding in number to said photosensitive elements, each of said operational amplifier circuits presenting a high impedance input to said average voltage signal and to the signal from the corresponding photosensitive element and being connected for differential amplification.

9. The apparatus of claim 8 wherein each of said photosensitive elements comprises a photodiode having an anode and a cathode.

10. The apparatus of claim 9 wherein each of said photodiodes has its anode connected to a load resistor with the series combination of the photodiode and the load resistor being connected across a source of potential and said plurality of resistors being individually connected to the anodes of said photodiodes.

11. Apparatus for detecting temporally coherent light intermixed with incoherent background light, said coherent and incoherent light being of widely varying and unrelated intensities, said apparatus comprising:
   an interferometer for generating an interference pattern comprising light and dark fringes in response to temporally coherent light incident thereon;
   a plurality of semiconductor photosensitive elements upon which said interference pattern is directed, said photosensitive elements generating voltage signals representative of light energy incident thereon;
   signal averaging means comprising a passive resistor network connected to said elements for determining an average voltage signal, said passive resistor network comprising a plurality of resistors corresponding in number to said photosensitive elements, each of said resistors having two terminals with one of said terminals connected to a corresponding one of said photosensitive elements and the other of said terminals connected into a common junction to generate an average voltage signal at said common junction; and
   comparator means for comparing each of said signals to said average signal to determine whether one of said light fringes or one of said dark fringes is incident on respective ones of said elements by determining whether the corresponding signal is greater than or less than said average signal, said comparator means comprising a plurality of operational amplifier circuits corresponding in number to said photosensitive elements, each of said operational amplifier circuits presenting a high impedance input to said average voltage signal and to the signal from the corresponding photosensitive element and being connected for differential amplification whereby the dynamic range of said semiconductor photosensitive elements can be utilized to accommodate the widely varying intensities of said coherent and incoherent light incident on said interferometer.

* * * * *

UNITED STATES PATENT AND TRADEMARK OFFICE
CERTIFICATE OF CORRECTION

PATENT NO. : 4,515,478

DATED : May 7, 1985

INVENTOR(S) : Paul T. Ballard and Gordon R. Little

It is certified that error appears in the above—identified patent and that said Letters Patent is hereby corrected as shown below:

Column 3, line 38, "No. 14" should read --No. 4--.

Signed and Sealed this

Eleventh Day of March 1986

[SEAL]

Attest:

DONALD J. QUIGG

Attesting Officer

Commissioner of Patents and Trademarks